(12) United States Patent
Notohamiprodjo et al.

(10) Patent No.: US 7,816,803 B1
(45) Date of Patent: Oct. 19, 2010

(54) POWER LINE CONTROL SYSTEM

(75) Inventors: Hubertus Notohamiprodjo, Union City, CA (US); Jingming Wang, San Jose, CA (US); Jianding Luo, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 426 days.

(21) Appl. No.: 11/848,078

(22) Filed: Aug. 30, 2007

(51) Int. Cl.
*H02J 3/02* (2006.01)
(52) U.S. Cl. .......................................... 307/3; 307/149
(58) Field of Classification Search ................ 307/149, 307/3
See application file for complete search history.

(56) References Cited

U.S. PATENT DOCUMENTS

| | | | |
|---|---|---|---|
| 6,278,357 B1 * | 8/2001 | Croushore et al. | 375/259 |
| 6,718,503 B1 * | 4/2004 | Lerner et al. | 714/755 |
| 7,158,539 B2 * | 1/2007 | Zhang et al. | 370/473 |
| 2007/0297079 A1 * | 12/2007 | Motwani | 360/51 |

* cited by examiner

*Primary Examiner*—Robert L. Deberadinis
(74) *Attorney, Agent, or Firm*—Kenyon & Kenyon LLP (57) ABSTRACT

A system and method for processing data includes coupling circuitry for connecting a system to a power line and receiving data from the power line, packet detection circuitry for detecting synch mark in the data, and a processor for processing data upon detecting a synch mark.

22 Claims, 7 Drawing Sheets

POWER LINE CONTROL SYSTEM

FIELD OF THE INVENTION

The present invention relates to a system for transmitting a data signal over power lines.

BACKGROUND

In any large structure, whether it be a home or a large office building, it is desirable to have a centralized control system capable of controlling all the various electronic devices in the home or building. For example, in a multi-story office building, it is desirable for a building manager to be able to control the lights, fans, and other electronic devices on the various floors without having to physically go to each floor. One such way to implement this control system is to connect the various devices through either a wired or wireless network. Both of these solutions, however, have drawbacks. Wired networks can be time consuming and costly to implement, and wireless networks frequently have poor signal quality and even dead zones throughout a building.

A cost effective means for networking devices is to use the existing power line infrastructure within a borne or building, making it possible for one device to communicate with another without the expense of rewiring. Power line communication, however, also presents many challenges, the biggest of which is noise. Power lines contain strong impulsive noise as well as other types of noise caused by the specific devices connected to the power lines. Every device is going to create unique noise, and in the case of some devices, such as an elevator, that noise can be exceptionally strong.

Another challenge in transmitting data across power lines is developing a system that can operate in a multitude of environments. For example, in a building the lighting may operate at 277 volts while devices plugged into the all outlets operate at 110 volts. Voltages, as well as frequency regulations, can also vary from country to country. Another challenge in using the power lines as a communications medium is the low external impedance of the power lines, making it difficult to couple a transceiver to the power lines. Adding to the challenge is the fact that all environments are different. The noise, impedance, and voltage levels will change from country to country, building to building, and even room to room within a building.

In light of the foregoing challenges, a new system for reliably transmitting data over power lines is desirable.

SUMMARY OF THE INVENTION

Aspects of the present invention call for transmitting data signals over a power line network. A system embodying aspects of the present invention can have devices and a control center coupled to a power line. The devices and control system can contain transceiving circuitry, enabling the devices to send and receive data over the power line. When sending data, the transceiving circuitry is capable of sending data packets with a synch mark identifiable to a particular device or group of devices on the network. When not sending data, the transceiving circuitry is capable of monitoring incoming signals for the synch mark, the presence of which indicates another device on the network is sending data.

DETAILED DESCRIPTION

Figure 1A:
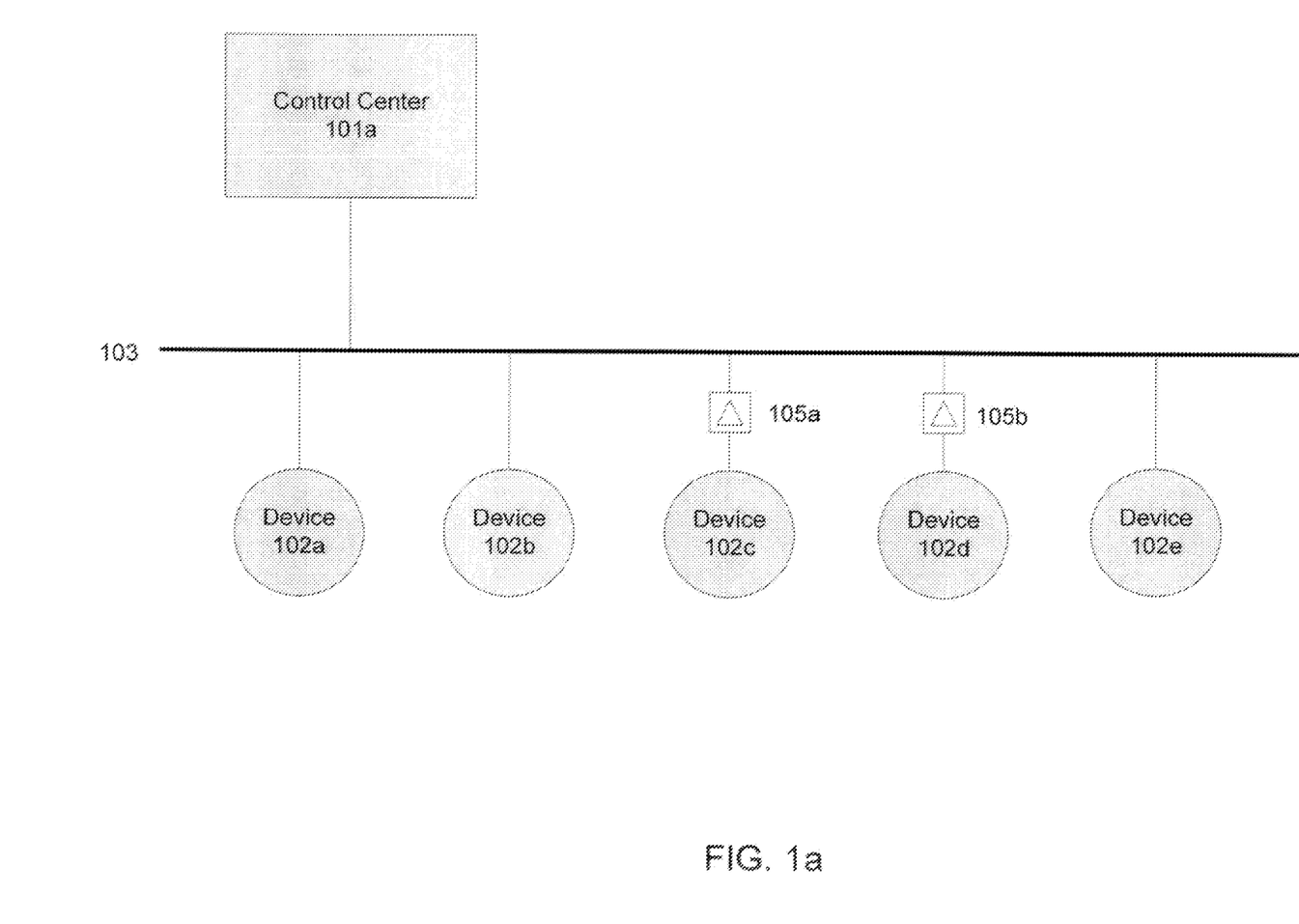
FIG. 1a shows a power line communications system embodying aspects of the present invention.

FIG. 1a illustrates a system embodying aspects of the present invention. The system may include devices 102a-e connected to a power line 103. In a large building the devices 102a-e might be lights, fans, motors, or practically any other electronic equipment or appliances. In a home environment, typical devices 102a-e might be refrigerators, washers and dryers, televisions; pool pumps, or any other household appliance connected to the house's electrical wiring. It is also contemplated that aspects of the present invention could be used on a larger scale, such as by a utility company for reading meters or controlling parts of a power grid.

A control center 101a, configured to communicate with the various devices 102a-e, may also be connected to the power line 103. The control center 101a can act as an interface with the power line network. For example, the control center 101a might be a server accessible by computer terminals.

Each device 102a-e and the control center 101a can have a unique network address used to identify itself on the network, or alternatively, a group of devices (e.g. 102a, b, and e) can share a network address and be controlled together. The control center 101a and devices 102a-e can communicate with one another by inserting into data transmissions a synch mark corresponding to a device's 102a-e network address. Alternatively, the synch mark can be common to all devices 102a-e on the network, and a particular device's 102a-e network address can be contained elsewhere in the data transmission. If a device 102a-e or the control center 101a detects its synch mark, then it knows to look for and process corresponding data. Synch marks and data packets will be discussed in more depth later in the specification.

If there is significant signal attenuation or degradation, the power line 103 may utilize a series of repeaters 105a-b in order to communicate with devices (e.g 102e) that are farther away. An aspect of the present invention may use the devices themselves 102a-e as repeaters. For example, pie, the control center 101a can select the most appropriate device 102a-e to use as a repeater. If the control center 101a attempts to communicate with device 102e, it may opt to use device 102d as a repeater. Alternatively, if device 102d is either too far away (i.e. the signal is too attenuated by the time it reaches device 102d) or device 102d cannot act as a repeater, then the control center 101a may opt to use device 102c as a repeater instead. The control center 101a can maintain routing information for all the devices 102a-e on the network and can determine the best path to send data.

Figure 1B:
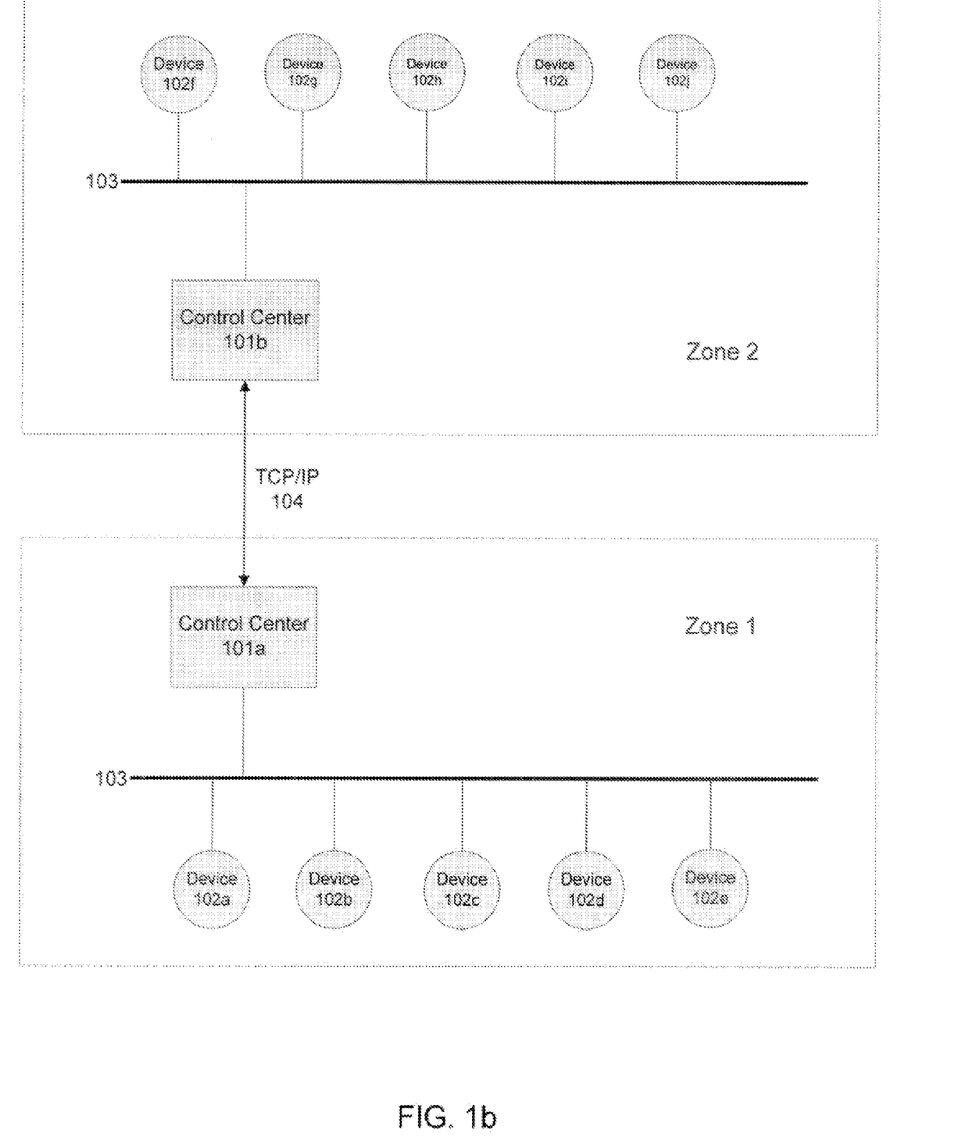
FIG. 1b shows a power line communications system with multiple zones connected through a TCP/IP connection.

As shown in FIG. 1b, another aspect of the present invention may include multiple systems such as the one described in FIG. 1a in a multi-zone configuration, and having the control centers 101a and b within each zone communicate with one another through a medium such as TCP/IP 104. In such a configuration, devices 102*a-e* in one zone, such as a bottom floor in a tall building, can communicate with the control center 101*b* and devices 102*f-j* on one of the top floors in the building without having the reliability issues associated with sending a signal long distances over the power line 103.

Figure 2A:
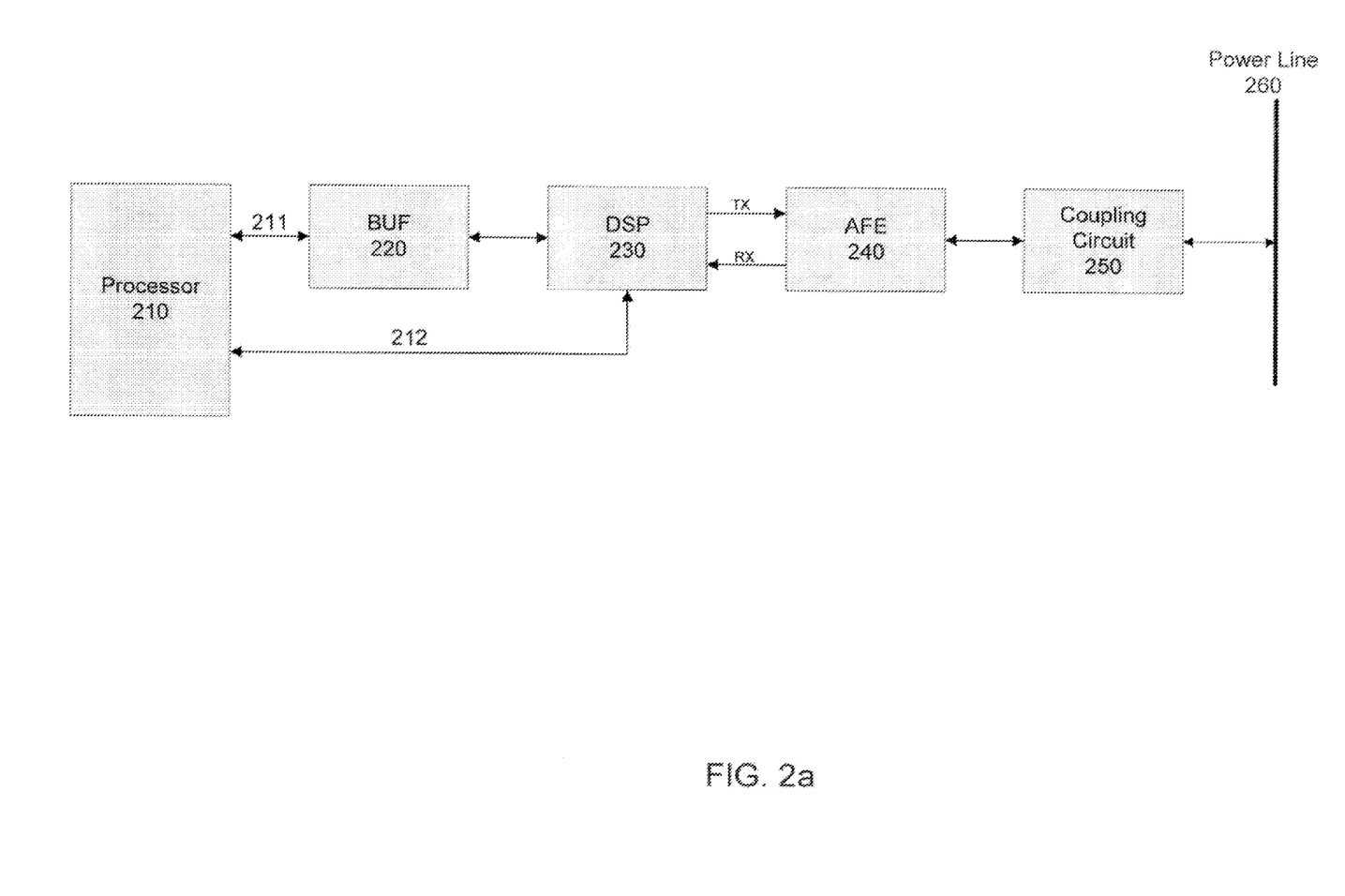
FIG. 2a shows a diagram of a circuit in accordance with one embodiment of the invention, configured to transmit and receive data signals over power lines.

FIG. 2*a* illustrates one embodiment of the present invention. The circuit may be configured to both transmit and receive data. In a system such as the one shown in FIG. 1*a*, each individual device 102*a-e* as well as the control center 101*a* might contain transceiving circuitry like that illustrated in FIG. 2*a*.

The circuit can include a processor 210, such as an embedded ARM processor, capable of handling the signal processing. The processor 210 can be connected to a buffer 220 which can be SRAM or another form of computer memory. The buffer 220 can be connected to digital signal processing circuitry 230 ("DSP") capable of both transmitting (TX) and receiving (RX) data. The DSP 230 can be connected to analog front end circuitry 240 ("AFE"), and the AFE 240 can be connected to the power line 260 through coupling circuitry 250.

Figure 2B:
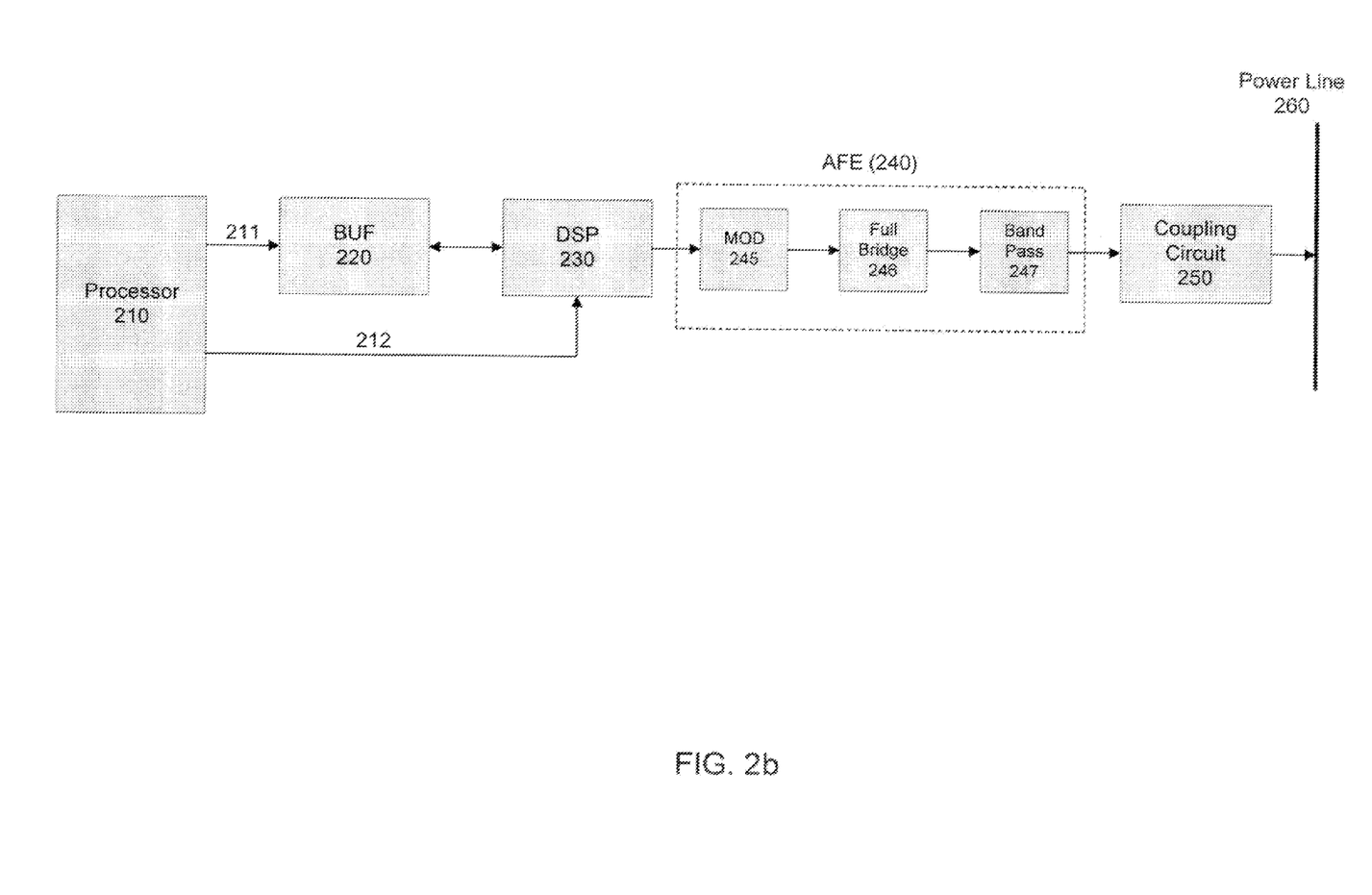
FIG. 2b shows a diagram of one embodiment of the circuit of FIG. 2a, highlighting the transmission of data signals over the power lines.

FIG. 2*b* illustrates the circuit of FIG. 2*a* but with aspects of the transmitting circuitry shown in further detail. The processor 210 can send the bits of a data packet to be transmitted to the buffer 220 (see connection 211). The processor 210 may also be configured to send control signals directly to the DSP 230 (see connection 212). The control signals can instruct the DSP 230 to access the data packet in the buffer 220 and to modulate the data packet so that it can be transmitted over the power lines 260. The DSP 230 then can send the modulated data packet to the power lines 260 through analog front end circuitry 240 ("AFE") and coupling circuitry 250

The power lines 260 may carry a heavy, always changing load and may have a wide range of impedances (e.g., from $0.1\Omega$ to $100\Omega$). Desirably, the AFE 240 is designed to accommodate such a range. For example, if the internal impedance of the circuit of FIG. 2*b* is $10\Omega$ and the impedance of the power line 260 is only $0.1\Omega$, then it will be difficult for the circuit to transmit the signal to the power line 260 because most of the signal's power will be internally dissipated and not transferred to the power line.

For transmitting, the AFE 240 can utilize a Class D amplifier where the devices involved are on-off controlled. The circuitry within the dotted lines of FIG. 2*b* illustrates aspects of the transmitting circuitry within the AFE 240. A modulator 245 can modulate the digital signal from the DSP 230. The modulator 245 might be either an analog pulse width modulator, pulse density modulator, or a sigma-delta modulator. Full bridge circuitry 246 can then convert the digital signal into a power signal, and the power signal can be filtered through a band pass filter 247.

Figure 2C:
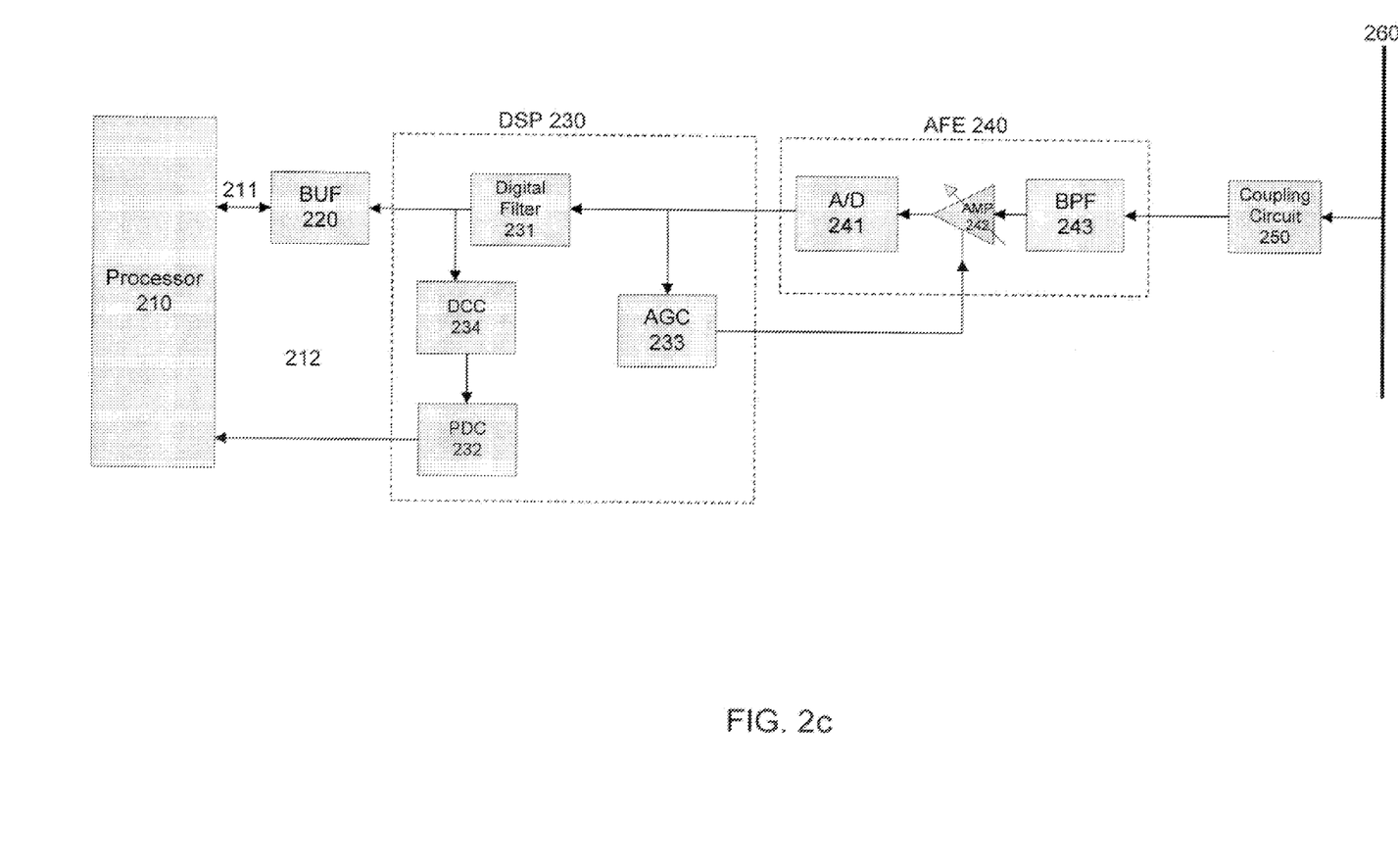
FIG. 2c shows a diagram of one embodiment of the circuit of FIG. 2a, highlighting the reception of data signals over the power lines.

FIG. 2*c* illustrates the circuit of FIG. 2*a* but with aspects of the receiving circuitry, particularly the DSP 230 and AFE 240, shown in further detail. When receiving, a signal from the power line 260, the signal being received can initially be filtered by the AFE 240 and converted to the digital domain. The DSP 230 can analyze the signal being received to determine if it in fact is a data packet intended to be processed. If the signal is determined to be a data packet, then the DSP 230 can send an interrupt request directly to the processor 210 and can send the incoming data to the buffer 220. The interrupt request can instruct the processor 210 to access the data in the buffer 220. The processor 210 can then demodulate and process the data.

The AFE 240 can be connected to a power line 260 through coupling circuitry 250. Signals received from the power line 260 by the AFE 240 might first go through a band pass filter 243 ("BPF"). In one embodiment, the system may be configured to communicate at 100 kHz, in which case the BPF may filter all frequencies below 60 kHz and above 140 kHz. Other suitable communications frequencies and corresponding BPF values will be known to ordinarily skilled artisans. The filtered signal may then be sent through an amplifier 242 to an analog to digital converter 241 ("A/D") in one embodiment, the amplifier 242 might be a variable gain amplifier controlled by an adjustable gain controller 233 in the DSP 230.

The digital signal output by the A/D 241 can then be received in the DSP 230 where it may be filtered by a digital filter 231 and down sampled by down conversion circuitry (DCC) 234. The processed signal can then be fed into a buffer 220 while packet detection circuitry 232 ("PDC") examines the signal for the presence of a synch mark. The signal review may occur at the same time, or close to the same time, as the processed signal is fed into buffer 220. If a synch mark is detected, then the PDC 232 may send an interrupt request to the processor 210, instructing the processor 210 to retrieve the data packet from the buffer 220.

Another aspect of the present invention may include dual frequency monitoring. A traditional system may transmit at 100 kHz. For any number of known reasons, a system may have greater than usual noise around the 100 kHz frequency range, degrading signal quality and lessening the chances of transceivers effectively communicating. One way of lessening this possibility is to transmit the signal at different frequencies. For example, a system may try to transmit data twice at 100 kHz, and if unsuccessful, then try to transmit it at 70 kHz, in such a system, the receiver may know the pattern the transmitter is using, and will monitor the frequencies accordingly.

An alternative solution might be to monitor multiple frequencies at the same time. In one embodiment, the present invention may allow users to program multiple frequencies, for example, through a firmware update. The DCC 234 can be configured to contain two mixers with two direct digital frequency synthesizers (DDFSs) or a single, multiplexed DDFS. The two output frequencies of the DDFS can be controlled by the processor 210. The PDC 232 can be configured to arbitrate between the two frequencies and determine which one is active.

Another aspect of the present invention may include a low power mode, in which the processor 210 can be turned off in order to consume less energy. For the majority of its time online, most devices are not going to be sending or receiving data. Instead, they are going to be "listening" for a synch mark telling the device that there are data packets to be processed. While the system is in a listening mode, only certain parts of the circuitry, such as the DSP which is searching for its synch mark, need to be active. Other parts of the circuitry, including the processor 210, may be turned off.

Figure 3:
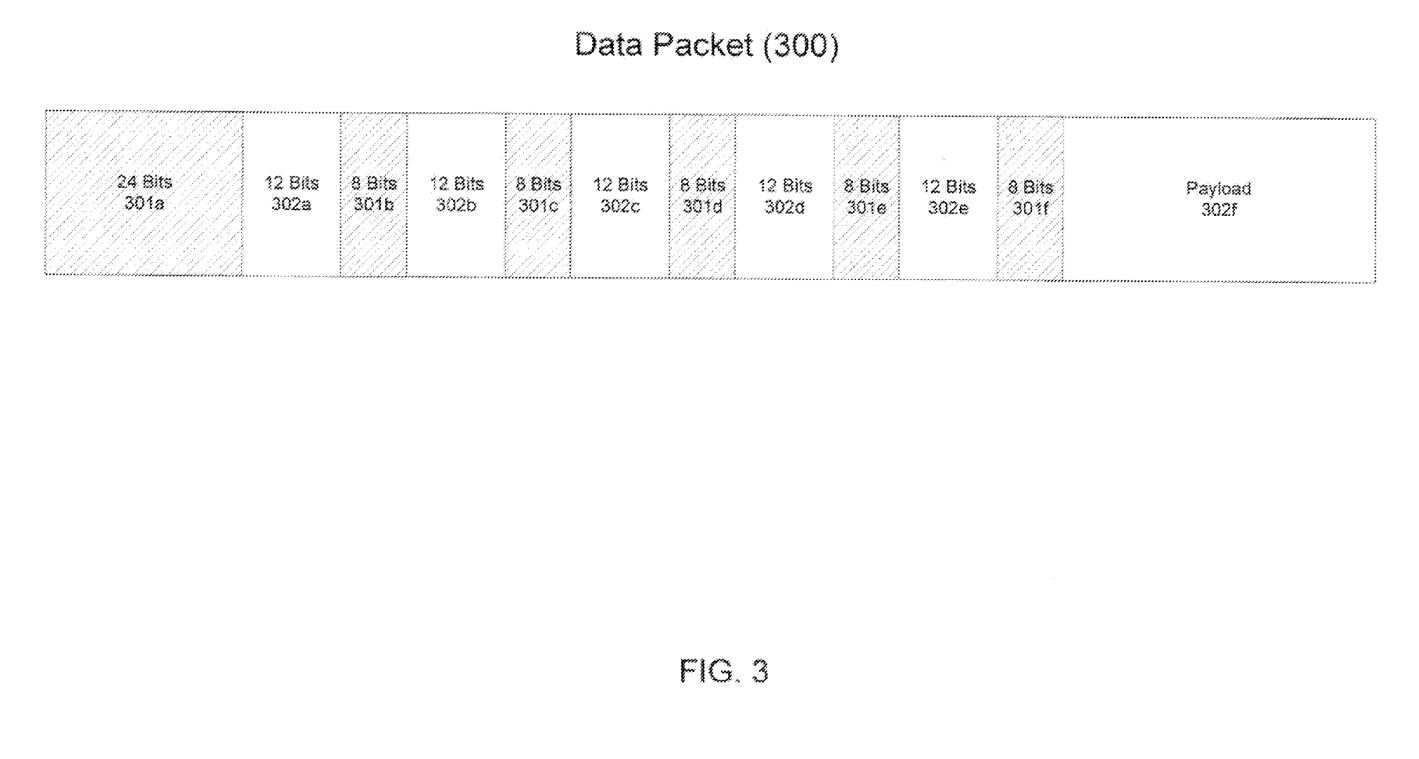
FIG. 3 shows a time domain representation of a data packet embodying aspects of the present invention.

FIG. 3 illustrates a time-domain representation of a data packet 300 embodying aspects of the present invention. In one embodiment, a synch mark is interleaved with payload within a data packet 300. For example, in the data packet 300, bits 301*a-f* represent the synch mark, while bits 302*a-f* represent the payload. A typical data packet 300 may contain 64 bits of synch mark 301*a-f* interleaved with payload. The length of the data packet 300 can be variable. For example, blocks 302*a-e* can be greater or fewer than 12 bits. Similarly, the final block of payload 302*f* after the transmission of the synch mark 301*a-f* can contain a greater number of bits than the previous blocks of payload 302*a-e* interleaved between the synch mark portions 301*a-f*. Refuting back to FIG. 2*a*, the interleaving of the synch mark 301a-f and the payload 302a-f may be performed by the processor 210.

High levels of noise frequently present in power transmission systems can make identifying a signal within the noise challenging. Distributing a synch mark 301a-f throughout a data packet 300 helps the transceiver identify the synch mark 301a-f in noisy environments. A power line system may contain a high level of impulsive noise. If all 64 bits of synch mark 301a-f are transmitted consecutively, then the system may not be able to identify the synch mark 301a-f if a noise pulse is present during the time of transmission. Distributing the synch mark 301a-f throughout the data packet 300 lessens the likelihood of this occurring. Even if a portion of the synch mark (e.g. 301c) is undetectable because of a noise pulse, other bits (e.g. 301a-b and 301d-f) still might be detected.

In one embodiment, more bits of synch mark (e.g. 301a), for example 24 bits, may be present at the beginning of the data packet 300. Having more bits of synch mark 301a at the beginning of the data packet 300 makes it easier for the system to perform timing recovery. Additionally, the analog to digital conversion can degrade the beginning of the signal. If that occurs, it can be beneficial to have more bits of synch mark 301a-f present at the beginning of the data packet 300 to make sure that there are sufficient synch mark bits at the beginmg to enable detection and to correctly identify where the synch mark begins and the payload begins. One type of interleaving (12 bits of payload, followed by 8 bits of synch mark) is shown, but other interleaving patterns, either regular or irregular (i.e. different numbers of payload bits followed by different numbers of synch bits) may be used, so long as the synch mark portions can permit detection. A system designer can determine a desired interleaving pattern based on factors such as providing adequate time for circuit components to settle, improving timing recovery, and reliably detecting the arrival of a packet in a power line environment with strong noise.

In one embodiment, a system embodying aspects of the present invention may receive data at a rate of 10 kilobaud, and have PDC 232 sample incoming signals at 40 kilosamples per second (40 ksps). A 40 ksps sampling rate in conjunction with a 10 kilobaud data rate would mean that each bit will be sampled four times. Higher or lower sampling rates or numbers of samples may be suitable, depending on known power transmission conditions. The PDC circuitry 232 can then compare the sampled bits to the bits of the synch mark, which can be stored in some form of memory. There are several different methods that the PDC 232 might use to utilize the four samples per bit. For example, if the first bit of the 64-bit synch mark is a 1, the PDC might identify a match if two of the four samples indicate a 1, three of the four indicate a 1, or any other similar approach. The PDC 232 might also use known algorithms to determine which of the four samples is the most reliable.

A synch mark may contain any of a number of known error detecting or error correcting codes, such as for example, a parity bit. The PDC 232 can apply the error correcting or error detecting code and can have a tolerance level for deviation from the synch mark. Given, the noise levels usually present in a power line system, it may be unlikely that the PDC 232 will correctly detect all 64 bits of synch mark. Therefore, the PDC 232 can have a fault tolerance characteristic in which, even if the detected mark is not an exact match, it can be treated as a match because it is close enough to being an exact match (e.g. within a tolerance level of being an exact match).

Figure 4:
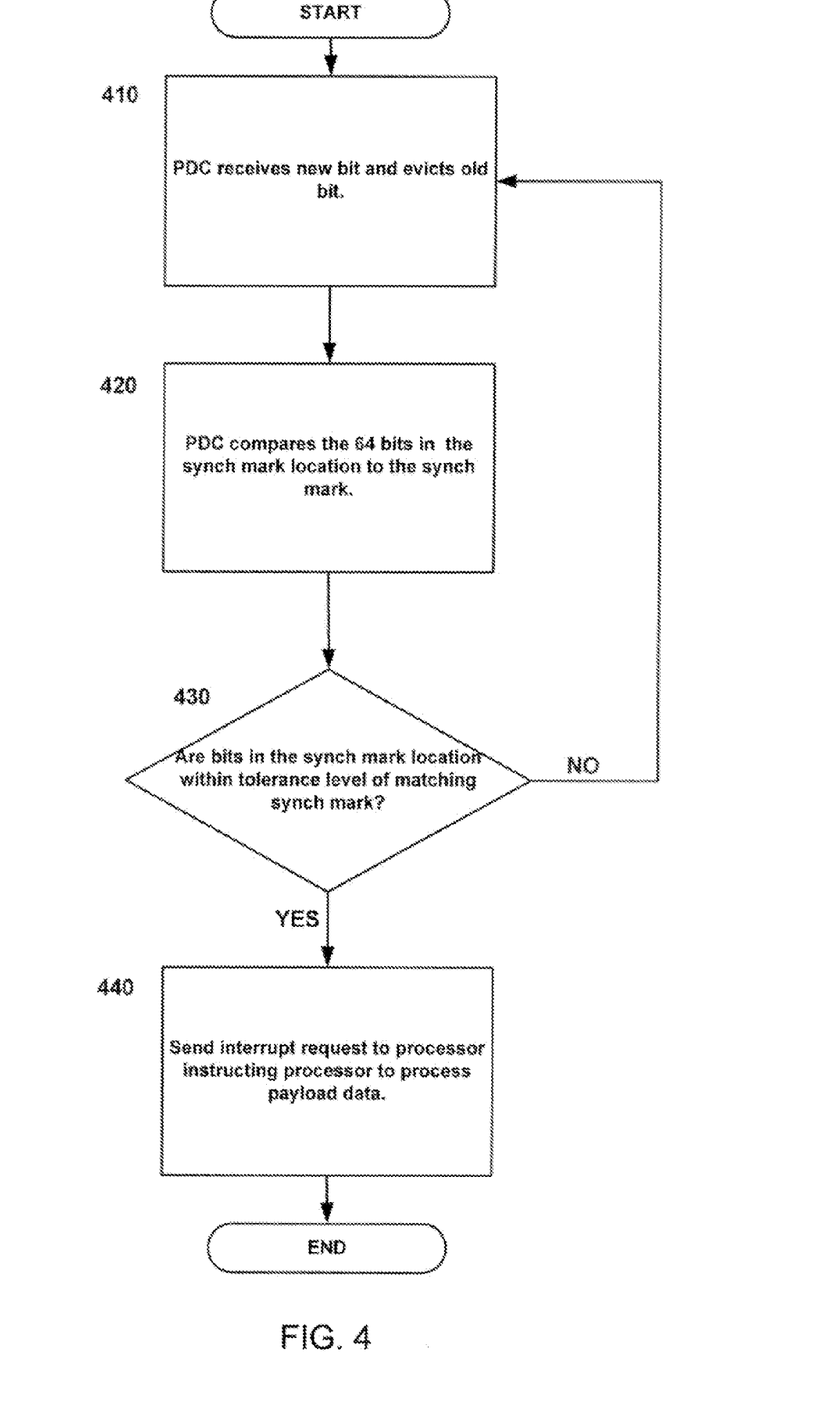
FIG. 4 is a flow chart of a method according to one embodiment of the invention.

FIG. 4 is a flow chart of one embodiment of a method the PDC 232 may use when looking for the synch mark. The PDC 232 can continuously monitor any incoming signals for the presence of the synch mark. The PDC 232 can maintain a certain number of bits in a memory. For example, in one embodiment, the PDC 232 may maintain 124 bits. The PDC 232 can know that the first 24 bits are where synch mark would be located, the next 12 would be payload, the next 8 would be synch mark, and so on.

After receiving a new bit of the digital signal from the AFE (see block 410), the PDC 232 can look at the 64 of the 124 bits where the synch mark will be (for convenience, referred to as the "synch mark location") and determine if the 64 bits are within the tolerance level of being an exact match (see block 420). If the PDC 232 determines that the 64 bits are not within the tolerance level of being an exact match, then the PDC 232 will continue to look for the synch mark (see block 430, the "no" path).

As a new bit is stored in the memory, the oldest bit will be evicted (the oldest bit being the first bit of the synch mark) (see block 410). When the new bit is stored, the bit that was previously the second bit becomes the first, the bit that was previously the third bit becomes the second and so on. The PDC 230 can again look at the 64 bits in the synch mark location and again determine if the 64 bits are within the tolerance level of being an exact match (see block 420). The PDC 230 can repeat this procedure until the detection of the synch mark. Upon detection of the synch mark (see block 430, the "yes" path), the PDC 232 can send an interrupt request to the processor 210, and the processor 210 will process the data (see block 440).

The foregoing description of embodiments is provided to enable a person skilled in the art to make and use the present invention. Various modifications to these embodiments will be readily apparent to those skilled in the art, and the generic principles and specific examples defined herein may be applied to other embodiments without the use of inventive faculty. For example, some or all of the features of the different embodiments discussed above may be deleted from the embodiment. Therefore, the present invention is not intended to be limited to the embodiments described herein but is to be accorded the widest scope defined only by the claims below and equivalents thereof.

What is claimed is:

1. An apparatus for processing data over a power line, said apparatus comprising:
    coupling circuitry for connecting said apparatus to the power line;
    packet detection circuitry for detecting a synch mark in said data, said data containing blocks of the synch mark interspersed with blocks of payload, and the synch mark indicating that there are data packets to be processed; and
    a processor configured to process said payload upon said packet detection circuitry detecting said synch mark.

2. The apparatus of claim 1, wherein the synch mark comprises a fixed number of bits and a first block of the synch mark comprises a greater number of the bits than do subsequent blocks of the synch mark.

3. The apparatus of claim 1, wherein the data comprises an error correcting code, and wherein the packet detection circuitry is configured to process the error correcting code.

4. The apparatus of claim 1, further comprising:
    circuitry capable of instructing the processor to process data upon detecting the synch mark.

5. The apparatus of claim 1, wherein the processor is configured to produce data packets with an interspersed synch mark to be transmitted over the power line.

6. The apparatus of claim 1, wherein the packet detection circuitry is capable of detecting synch marks being transmitted at more than one frequency.

7. The apparatus of claim 1, wherein the packet detection circuitry samples said data at a rate at least twice a transmission rate of said data.

8. The apparatus of claim 1, wherein the synch mark corresponds to a network address of a device coupled to the power line.

9. The apparatus of claim 1, wherein the synch mark is common to all devices coupled to the power line.

10. A method for processing data over a power line, said method comprising:
    responsive to receiving data from said power line, detecting a synch mark in said data, said data containing blocks of said synch mark interspersed with blocks of payload and the synch mark indicating that there are data packets to be processed;
    upon detection of said synch mark, instructing a processor to process said payload.

11. The method of claim 10, wherein said synch mark comprises a fixed number of bits and a first block of said synch mark comprises a greater number of said bits than do subsequent blocks of said synch mark.

12. The method of claim 10, further comprising:
    processing an error correcting code, said data comprising said error correcting code.

13. The method of claim 10, further comprising:
    producing data packets with an interspersed synch mark to be transmitted over said power line.

14. The method of claim 10, further comprising:
    detecting synch marks being transmitted at more than one frequency.

15. The method of claim 10, further comprising:
    sampling said data at a rate at least twice a transmission rate of said data.

16. An apparatus for processing data over a power line, said apparatus comprising:
    coupling means for coupling said apparatus to said power line;
    detection means for detecting a synch mark in said data, said data containing blocks of said synch mark interspersed with blocks of payload, and the synch mark indicating that there are data packets to be processed;
    processing means for processing said payload upon said detection means detecting said said synch mark.

17. The apparatus of claim 16, wherein said synch mark comprises a fixed number of bits and a first block of said synch mark comprises a greater number of said bits than do subsequent blocks of said synch mark.

18. The apparatus of claim 16, wherein said data comprises an error correcting code, and wherein said detection means is configured to process said error correcting code.

19. The apparatus of claim 16, further comprising:
    circuit means capable of instructing the processing means to process data upon detecting said synch mark.

20. The apparatus of claim 16, wherein said processing means is configured to produce data packets with an interspersed synch mark to be transmitted over said power line.

21. The apparatus of claim 16, wherein said detection means is capable of detecting synch marks being transmitted at more than one frequency.

22. The apparatus of claim 16, wherein said detection means samples said data at a rate at least twice a transmission rate of said data.

* * * * *